US007819630B2

(12) United States Patent
Nogami et al.

(10) Patent No.: US 7,819,630 B2
(45) Date of Patent: Oct. 26, 2010

(54) STEAM TURBINE BLADE, STEAM TURBINE ROTOR, STEAM TURBINE WITH THOSE BLADES AND ROTORS, AND POWER PLANT WITH THE TURBINES

(75) Inventors: Shuhei Nogami, Hitachi (JP); Hideo Yoda, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 905 days.

(21) Appl. No.: 11/356,002

(22) Filed: Feb. 17, 2006

(65) Prior Publication Data
US 2006/0222501 A1 Oct. 5, 2006

(30) Foreign Application Priority Data
Apr. 1, 2005 (JP) .............................. 2005-105607

(51) Int. Cl.
*B64C 11/04* (2006.01)
(52) U.S. Cl. .................................. 416/219 R
(58) Field of Classification Search ............... 415/220; 416/219 R, DIG. 2
See application file for complete search history.

(56) References Cited

U.S. PATENT DOCUMENTS

| | | | | |
|---|---|---|---|---|
| 2,415,847 | A | * | 2/1947 | Redding .................. 416/219 R |
| 2,683,583 | A | * | 7/1954 | Huebner, Jr. et al. ......... 415/220 |
| 2,862,686 | A | * | 12/1958 | Bartlett ........................ 416/233 |
| 3,112,914 | A | * | 12/1963 | Wellman ................. 416/219 R |
| 4,191,509 | A | | 3/1980 | Leonardi |
| 6,106,233 | A | * | 8/2000 | Walker et al. ............ 416/213 R |
| 6,582,195 | B2 | * | 6/2003 | Davidson ................. 416/198 A |
| 6,739,836 | B2 | * | 5/2004 | Pinzauti et al. ......... 416/219 R |
| 7,090,464 | B2 | * | 8/2006 | Henning et al. ................ 416/61 |
| 7,182,577 | B2 | * | 2/2007 | Yamashita et al. ........... 416/191 |
| 7,416,389 | B2 | * | 8/2008 | Henning et al. ................ 416/61 |
| 2003/0012655 | A1 | * | 1/2003 | Sasaki et al. ............. 416/219 R |
| 2004/0258529 | A1 | * | 12/2004 | Crain et al. .............. 416/219 R |

(Continued)

FOREIGN PATENT DOCUMENTS

JP 54-96618 7/1979

(Continued)

OTHER PUBLICATIONS

Chinese Office Action, Application No. 2006100082172, Jul. 27, 2007, 4 pages.

*Primary Examiner*—Edward Look
*Assistant Examiner*—Aaron R Eastman
(74) *Attorney, Agent, or Firm*—Mattingly & Malur, P.C.

(57) ABSTRACT

A steam turbine blade in which the turbine blade has a blade root of the axially-inserted fir tree type and a larger number of turbine blades can be attached in a restricted outer peripheral region of a turbine rotor by arranging the blade root to be oriented in a direction forming a predetermined angle α larger than 0° relative to the axial direction of the turbine rotor. The steam turbine blade can suppress peak stresses generated at the bottoms of notches formed in the blade root and a blade groove and also suppress fretting fatigue from being induced by contact between peak stress generating areas and areas opposed to the peak stress generating areas at the notch bottoms. The steam turbine blade includes an airfoil, and a blade root attached to a turbine rotor and having plural stages of hooks in the radial direction of the turbine rotor.

14 Claims, 6 Drawing Sheets

U.S. PATENT DOCUMENTS

| | | | |
|---|---|---|---|
| 2005/0249599 A1* | 11/2005 | Hemsley et al. | 416/204 R |
| 2006/0177314 A1* | 8/2006 | Yamashita et al. | 416/219 R |

FOREIGN PATENT DOCUMENTS

| | | |
|---|---|---|
| JP | 5-086805 | 4/1993 |
| JP | 08-260902 | 10/1996 |
| JP | 8-260902 | 10/1996 |
| JP | 2003/014529 | 2/2003 |
| JP | 2004/022923 | 3/2004 |
| JP | 2004-116364 | 4/2004 |
| JP | 2004-257385 | 9/2004 |

* cited by examiner

P: CIRCUMFERENTIAL COMPRESSIVE LOAD ACTING ON HOOK

BLADE ROOT
BLADE ROOT
BLADE GROOVE

TORSIONAL MOMENT $\alpha = 0$

STEAM TURBINE BLADE, STEAM TURBINE ROTOR, STEAM TURBINE WITH THOSE BLADES AND ROTORS, AND POWER PLANT WITH THE TURBINES

BACKGROUND OF THE INVENTION

1. Field of the Invention

The present invention relates to a novel steam turbine blade and steam turbine rotor. The present invention also relates to a steam turbine with those blades and rotors, and a power plant with the turbines.

2. Description of the Related Art

FIG. 9 is an oblique perspective view showing a state where known steam turbine blades are attached to a turbine rotor. Each of the turbine blades used in a steam turbine has a blade root 4 formed in a complex shape, and is attached to the turbine rotor by engaging the blade root 4 in a blade groove (or a disc slot in the turbine rotor) 5 having a shape complementary to that of the blade root 4. The blade root 4 has, for example, a structure of the axially-inserted fir tree type. A shroud 1 is provided at a top of the turbine blade for the purpose of reducing the steam leak loss. Hitherto, the shroud 1 has been prepared separately from an airfoil 2 having a blade profile and combined to the airfoil 2 by riveting a tenon 6 formed at the blade top.

Centrifugal forces acting on the whole of the turbine blade are mostly supported at serrations of the blade root 4 and the blade groove 5. In the case of the turbine blade having the blade root 4 of the axially-inserted fir tree type, therefore, high peak stresses are generated due to the centrifugal forces in notches formed in the blade root 4 and the blade groove 5. Accordingly, the notches are the most risky portions with regards to fatigue that is one of turbine damage modes, and decide the life of the entire turbine in some cases.

One solution for overcoming that problem is proposed by Patent Document 1 (JP,A 54-96618). More specifically, as a method for reducing the peak stresses generated in the notches formed in the blade groove 5 and the blade root 4 of the turbine blade having the blade root 4 of the axially-inserted fir tree type, thereby prolonging the fatigue life, Patent Document 1 discloses such a structure that the radius at the bottom of each notch is increased to reduce the peak stress.

FIG. 10 is a plan view of airfoils and platforms forming roots of the airfoils in the structure of a known steam turbine blade as viewed from the outer peripheral side in the radial direction of a turbine rotor. In other words, Patent Document 2 (JP,A 8-260902) discloses such a structure that, as shown in FIG. 10, plan shapes of platforms 9 forming roots of airfoils 2 as viewed in the radial direction of the turbine rotor are inclined relative to the axial direction of the turbine rotor.

SUMMARY OF THE INVENTION

When, as shown in FIG. 9, the plan shape of each platform 9 forming the root of the blade profile portion is rectangular as viewed in the radial direction of the turbine rotor, the number of turbine blades capable of being attached in a restricted outer peripheral region of the turbine rotor is limited. On the other hand, when the axially-inserted platform 9 is formed to have a shape of parallelogram in plan as viewed in the radial direction of the turbine rotor and the platform 9 is oriented in a direction forming a predetermined angle α larger than 0° relative to the axial direction of the turbine rotor as shown in FIG. 10, a larger number of turbine blades can be attached in the restricted outer peripheral region of the turbine rotor. However, the shape and the direction of insertion of an inserted portion of the known blade root 4 are not clearly disclosed.

Hitherto, there has also been proposed a turbine blade having such a structure that the airfoil 2 and the shroud 1 are integrally molded and all the blades along an entire circumference are joined to each other in contact relation (hereinafter referred to as an "integral cover structure"). In one example of the integral cover structure, the turbine blade is assembled into a turbine rotor while the turbine blade is given with a torsional deformation within an elastic torsional deformation with the radial direction of the turbine rotor being an axis. After the assembly, contact pressure is caused to generate under action of an elastic restoring force between opposed surfaces of the blade and the shroud which are adjacent to each other. In most cases, the elastic restoring force is borne at a contact portion between the blade root 4 and the blade groove 5. Accordingly, when the elastic restoring force exceeds the frictional force generated at bearing surfaces of hooks formed in the blade root 4 and the blade groove 5, relative slide occurs between the bearing surfaces. FIG. 11 is a cross-sectional view, as viewed in the axial direction of the turbine rotor, showing a state where the blade root 4 and the blade groove 5 are in contact with each other at the bottoms of their notches between peak stress generating areas and areas opposed to the peak stress generating areas. With the occurrence of the above-mentioned relative slide, as shown in FIG. 11, the blade root 4 and the blade groove 5 may contact with each other at the bottoms of their notches between the peak stress generating areas and the areas opposed to the peak stress generating areas. According to Non-patent Document 1 ("Fatigue Design Handbook", edited by The Society of Materials Science, Japan, p 117, Yokendo Co., Ltd.), when a substance contacts with the peak stress generating area under certain contact pressure, there is a possibility that fretting fatigue is induced and the number of cycles to failure is reduced to 1/10 or below in comparison with the case of simple fatigue.

Also, when the blade root of the axially-inserted fir tree type is inserted in the direction forming the predetermined angle α larger than 0° relative to the axial direction of the turbine rotor, the peak stresses generated at the bottoms of the notches formed in the blade root and the blade groove are increased in comparison with the case of inserting the blade root parallel to the axial direction of the turbine rotor. This leads to a possibility that the fatigue life is shortened.

Further, the turbine blade having the integral cover structure accompanies a possibility that, upon the blade root 4 and the blade groove 5 contacting with each other at the bottoms of their notches between the peak stress generating areas and the areas opposed to the peak stress generating areas, fretting fatigue is induced in operation and the life of the turbine blade becomes shorter than the so-called fatigue life. This means the necessity of suppressing the contact between those areas in operation.

One object of the present invention is to provide a steam turbine blade, a steam turbine rotor, a steam turbine with those blades and rotors, and a power plant with the turbines, in which the turbine blade has a blade root of the axially-inserted fir tree type, and a larger number of turbine blades can be attached in a restricted outer peripheral region of a turbine rotor by arranging the blade root to be oriented in a direction forming a predetermined angle α larger than 0° relative to the axial direction of the turbine rotor.

Another object of the present invention is to provide a steam turbine blade, a steam turbine rotor, a steam turbine with those blades and rotors, and a power plant with the turbines, which can suppress peak stresses generated at the bottoms of notches formed in a blade root and a blade groove, and which can also suppress fretting fatigue from being induced by contact between peak stress generating areas and areas opposed to the peak stress generating areas at the bottoms of the notches formed in the blade root and the blade groove.

The present invention resides in a steam turbine blade comprising an airfoil; a blade root attached to a turbine rotor and having plural stages of hooks in the radial direction of the turbine rotor; and a platform provided between the airfoil and the blade root, wherein the blade root is shaped such that the blade root is straightly inserted at a predetermined angle α larger than 0° relative to the axial direction of the turbine rotor.

Preferably, the airfoil has a cross-section, as viewed in the axial direction of the turbine rotor, shaped such that a linear line connecting a leading edge and a trailing edge of the airfoil is inclined relative to the axial direction of the turbine rotor.

Preferably, the angle α is set in the same direction as the inclination of the airfoil and is smaller than 90° relative to the axial direction of the turbine rotor. The blade root has an inverted fir tree shape projecting from the platform side. The platform is shaped such that the platform is inserted at the angle α.

Preferably, respective values of the angle α and an angle θ formed by a load bearing surface of each of the hooks, which is positioned at the outer peripheral side in the radial direction of the turbine rotor, relative to a circumferential surface as viewed in the axial direction of the turbine rotor are set to fall within a region specified by the following formulas 1, 2 and 3:

$$500 \geq \alpha \times \theta \geq 0 \quad (1)$$

$$90 > \theta \geq 0 \quad (2)$$

$$90 > \alpha > 0 \quad (3)$$

Preferably, the steam turbine blade further comprises a shroud at a tip of the blade, and the shroud is formed integrally with the airfoil or is integrally combined with the airfoil by a tenon. The shroud is structured such that adjacent shrouds are tied in contact with each other while contact pressure is generated between the adjacent shrouds.

$$500 \geq \alpha \times \theta > 0 \quad (4)$$

$$90 > \theta \geq 39 \quad (5)$$

$$90 > \alpha > 0 \quad (6)$$

Preferably, the steam turbine blade further comprises a shroud at a tip of the blade, and the shroud is formed integrally with the airfoil or is integrally combined with the airfoil by a tenon. The shroud is structured such that adjacent shrouds are tied in contact with each other while contract pressure is generated between the adjacent shrouds.

Preferably, the angle θ is applied to only a serration of the hooks which is positioned at the innermost peripheral side in the radial direction of the turbine rotor.

Also, the present invention resides in a steam turbine rotor comprising a shaft; and a wheel joined to the shaft, the wheel including plural stages of slotted discs having slots into which steam turbine blades are attached, wherein each slot of the slotted disc is shaped in complementary relation to a shape of a blade root of the steam turbine blade, thus allowing the blade root to be straightly inserted in the disc slot at a predetermined angle α larger than 0° relative to the axial direction of the turbine rotor.

Preferably, the blade-root attached disc slot has plural stages of hooks in complementary relation to a shape of a blade root. Also, the blade-root attached disc slot has a fir tree shape.

Further, the present invention resides in a steam turbine comprising a steam turbine rotor having plural stages of slotted discs provided on a wheel joined to a rotor shaft; and plural stages of steam turbine blades attached to slots of the slotted discs, wherein the steam turbine rotor and the steam turbine blades are respectively the above-described steam turbine rotor and steam turbine blade.

Still further, the present invention resides in a steam turbine power plant equipped with any of a system including a high pressure steam turbine, an intermediate pressure steam turbine and a low pressure steam turbine, a system including a high/intermediate integral pressure steam turbine and a low pressure steam turbine, and a high/low integral pressure steam turbine, at least one of the high pressure steam turbine, the intermediate pressure steam turbine, the high/intermediate integral pressure steam turbine, the low pressure steam turbine, and the high/low integral pressure steam turbine being constituted by the above-described steam turbine.

When a cross-sectional shape of the blade root, as viewed in the radial direction of the turbine rotor, is largely inclined relative to the axial direction of the turbine rotor, a larger number of turbine blades can be attached in a restricted outer peripheral region of the turbine rotor. Hence, the axially-inserted blade root is formed to have a shape of parallelogram in plan as viewed in the radial direction of the turbine rotor, and the blade root is straightly inserted in the direction forming the predetermined angle α larger than 0° relative to the axial direction of the turbine rotor. As compared with the case of inserting the blade root parallel to the axial direction of the turbine rotor, the above arrangement causes a possibility that peak stresses generated at the bottoms of the notches formed in the blade root and the disc slots (blade grooves) are increased and fatigue life is shortened. However, such an increase of the peak stresses can be suppressed by setting the blade root insert angle α and the angle θ of the hook bearing surface so as to fall within the predetermined region.

The region specifying the values of the blade root insert angle α and the angle θ of the hook bearing surface according to the present invention will be described below. FIG. 4 is a graph showing the relationship among an increase rate (σx/σ0) of the peak stress, the angle θ of the hook bearing surface, and the blade root insert angle α when α is larger than 0°. In FIG. 4, the relationship among (σx/σ0), θ and α is plotted based on a finite element analysis using a three-dimensional model on an assumption that, looking at the bottom of the notch formed in the blade groove at the innermost peripheral side in the radial direction of the turbine rotor in a state where the steam turbine blade having the fir-tree type blade root formed with three or four stages of hooks in the radial direction of the turbine rotor is engaged in the blade groove, the peak stress generated at that notch bottom when the blade root insert angle α is 0° is σ0, and the peak stress generated at that notch bottom when the blade root insert angle α is larger than 0° is σx.

FIG. 5 shows an analytical model used in the three-dimensional finite element analysis regarding the present invention. As shown in FIG. 5, by introducing contact elements at contact surfaces between the hooks formed in the blade foot and the blade groove in the analytical model, friction at the contact surfaces was analyzed. According to the result of the analysis, (σx/σ0) and a are substantially in proportional relation such that (σx/σ0) is increased with an increase of α. Also, (σx/σ0) is increased at a larger rate with an increase of α as the angle θ, i.e., the angle formed as viewed in the axial direction of the turbine rotor between a plane perpendicular to an axis of the blade root and a plane parallel to contact portions of the hooks formed in the blade root and the blade groove, increases.

FIGS. 6A-6C are illustrations for explaining a mechanism that the peak stress is increased when a is larger than 0°. FIG. 6A is a cross-sectional view of the blade root and the blade groove, and FIGS. 6B and 6C are cross-sectional views taken along the line A-A in FIG. 6A. In operation, as shown in FIG. 6A, compressive forces P act on the right and left hooks of the blade groove in the circumferential direction of the turbine rotor. When the blade root insert angle α is 0°, the compressive forces are canceled on both the right and left sides (FIG. 6C). On the other hand, when the blade root insert angle α is larger than 0°, the compressive forces acting in hatched areas in FIG. 6B are not canceled on both the right and left sides, thus generating a torsional moment in the whole of the hook about an axis aligned with the radial direction of the turbine rotor (FIG. 6B). It is thought that, due to the torsional moment generated about the axis aligned with the radial direction of the turbine rotor, the peak stress generated at the notch bottom is increased when the blade root insert angle α is larger than 0° in comparison with the peak stress generated when the blade root insert angle α is 0°. The larger α, the larger is the area of the hatched areas in FIG. 6B and the larger is the torsional force. Thus, setting the value of α to a smaller value is effective in suppressing an increase of the peak stress when the blade root is inserted in the direction forming the angle α larger than 0° relative to the axial direction of the turbine rotor.

FIG. 7 is a graph showing the relationship between the blade root insert angle α and the angle θ of the hook bearing surface when (σx/σ0) is 1.1, 1.3 and 1.5, these ratios being extracted based on the results of FIG. 4. At any of the ratios, the relationship between α and θ is substantially in inverse proportion and is expressed by the following formula (7). The constants when (σx/σ0) is 1.1, 1.3 and 1.5 are respectively 170, 500 and 830. As seen from that evaluation, setting the product of α and θ to a smaller value is effective in suppressing an increase of the peak stress when the blade root is inserted in the direction forming the angle α larger than 0° relative to the axial direction of the turbine rotor.

$$\alpha \times \theta = \text{constant} \qquad (7)$$

When the turbine blade is applied to a steam turbine for a power plant, it is desired to have the fatigue life of from 20 to 30 years. A manner of achieving the fatigue life of 20 years or longer for the steam turbine blade, which is inserted in the direction forming the predetermined angle α (α>0) relative to the axial direction of the turbine rotor, with respect to the steam turbine blade, which is inserted parallel (α=0) relative to the axial direction of the turbine rotor with design in expectation of the fatigue life of 30 years, is as follows.

FIG. 8 is a graph showing the relationship between fatigue life and an allowable stress range. As shown in FIG. 8, because the allowable stress range for the fatigue life of 20 years is about 1.3 times that for the fatigue life of 30 years, the peak stress σx in the case of α>0 has to be less than 1.3 times the peak stress σ0 in the case of α=0. Accordingly, the product of the values of α and θ is desired to be not more than 500 for the steam turbine blade which is inserted in the direction forming the predetermined angle α larger than 0° relative to the axial direction of the turbine rotor.

In order to prevent the blade root and the blade groove from contacting at the bottoms of their notches between the peak stress generating areas and the areas opposed to the peak stress generating areas, and to suppress fretting fatigue induced in the peak stress generating areas, it is required that contact surfaces of the hooks formed in the blade root and the blade groove cause relative slide upon action of a centrifugal force, whereby a position of the blade root of the turbine blade relative to the blade groove in the turbine rotor is shifted toward a blade tip, thus producing a gap between the peak stress generating areas and the areas opposed to the peak stress generating areas at the notch bottoms in the blade root and the blade groove. An effective solution for that requirement is to set the value of θ such that Tan θ of the angle θ of the hook bearing surface is larger than the coefficient μ of friction between the contact surfaces, and that relative slide is caused between the hook contact surfaces upon action of a centrifugal force of any magnitude. In general, when the hooks of the turbine blade root and the blade groove contact with each other, the coefficient of static friction will not exceed 1. The coefficient of static friction between steels is 0.8, and when θ is 39°, Tan θ is 0.8. Therefore, θ is preferably not smaller than 39°.

According to the present invention, a steam turbine blade, a steam turbine rotor, a steam turbine with those blades and rotors, and a power plant with the turbines are be obtained in which the turbine blade has the blade root of the axially-inserted fir tree type, and a larger number of turbine blades can be attached in a restricted outer peripheral region of the turbine rotor by arranging the blade root to be oriented in the direction forming the predetermined angle α larger than 0° relative to the axial direction of the turbine rotor.

Further, according to the present invention, a steam turbine blade, a steam turbine rotor, a steam turbine with those blades and rotors, and a power plant with the turbines are obtained which can suppress peak stresses generated at the bottoms of the notches formed in the blade root and the blade groove, and which can also suppress fretting fatigue from being induced by contact between the peak stress generating areas and the areas opposed to the peak stress generating areas at the bottoms of the notches formed in the blade root and the blade groove.

DESCRIPTION OF THE PREFERRED EMBODIMENTS

The best mode for carrying out the present invention will be described below in connection with embodiments. Note that the present invention is in no way limited bar the following embodiments.

First Embodiment

Figure 1:
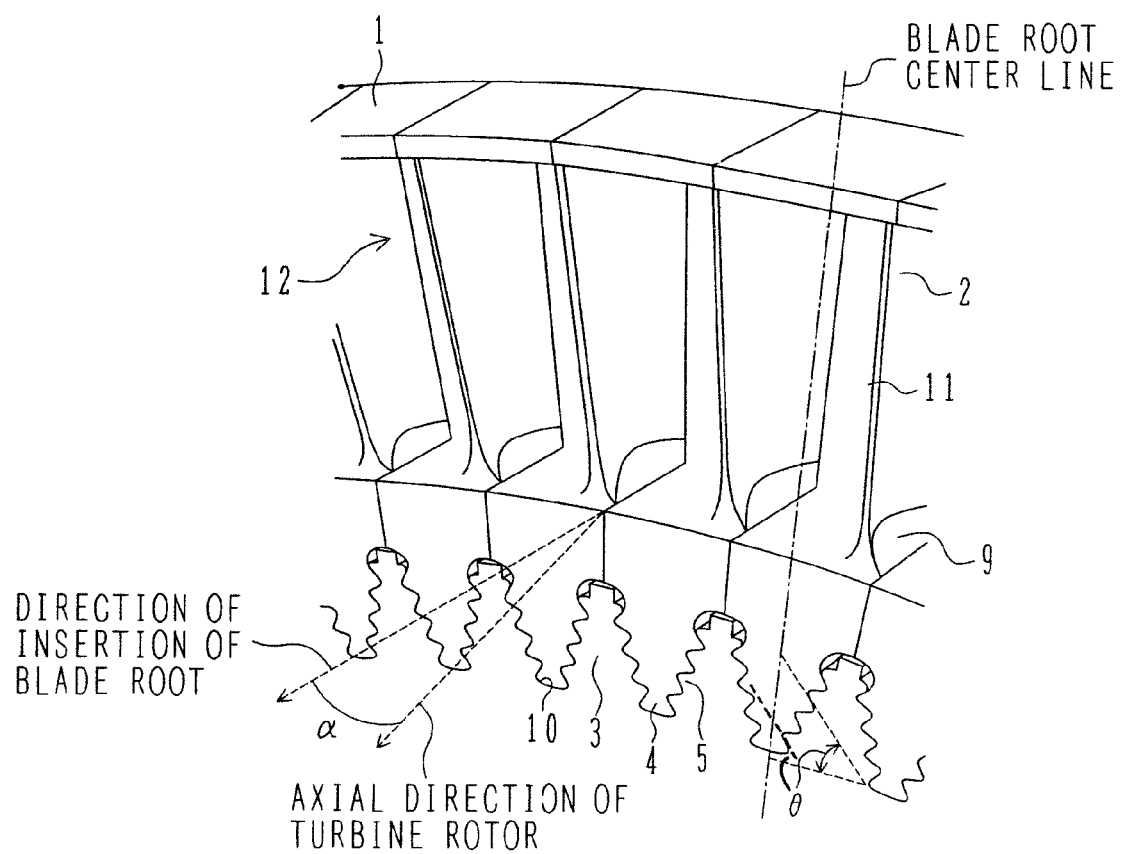
FIG. 1 is an oblique perspective view of steam turbine blades according to the present invention.

FIG. 1 is an oblique perspective view of steam turbine blades according to the present invention, the blades being attached to a turbine rotor. Each of the steam turbine blades in a first embodiment has an airfoil 2 and a fir-tree type blade root 4 which has an axis common to a blade groove (or a disc slot) 5 formed in an outer peripheral portion of a steam turbine rotor 3 and which is inserted in the blade groove 5 from one side in the axial direction of the turbine rotor for engagement between them. The blade root 4 is inserted in a direction forming a predetermined angle $\alpha$ larger than 0° relative to the axial direction of the turbine rotor. Hooks are formed in each of the fir-tree type blade root 4 and the blade groove 5 in plural stages in the radial direction of the turbine rotor. The steam turbine rotor 3 has a shaft and a wheel joined to the shaft. The wheel includes plural stages of slotted discs having slots into which the steam turbine blades are attached.

More specifically, as shown in FIG. 1, the steam turbine blade of this embodiment comprises the airfoil 2, the blade root 4 attached to the turbine rotor 3 and including four stages of bisymmetric hooks 10 in the radial direction of the turbine rotor, and a platform 9 provided between the airfoil 2 and the blade root 4. The blade root 4 is in the straight form of a parallelogram that is similar to a plan shape of the platform 9 and intersects the axial direction of the turbine rotor at the predetermined angle $\alpha$. Thus, the blade root 4 is straightly inserted into the disc slot formed in the turbine rotor shaft at the predetermined angle $\alpha$ relative to the axial direction of the turbine rotor.

By inserting the blade root 4 into the disc slot at the predetermined angle $\alpha$, the steam turbine blade can be attached in a larger number. Also, the length of the blade root 4 in the direction of insertion thereof is increased in comparison with that when the angle $\alpha$ is 0, while the width of the turbine rotor 3 in the axial direction can be reduced.

As viewed in the axial direction of the turbine rotor, the airfoil 2 has a cross-sectional shape inclined such that a trailing edge of the airfoil is inclined while curving away from the axial direction of the turbine rotor with respect to a leading edge of the airfoil. The angle $\alpha$ is set in the same direction as the inclination of the airfoil and is smaller than 90°, preferably 3-30° and more preferably 5-20°, relative to the axial direction of the turbine rotor.

The blade root 4 has the hooks 10 formed in an inverted fir tree shape projecting from the platform 9 side. Further, the platform 9 has a shape of parallelogram such that it is also straightly inserted at the same angle $\alpha$ as the blade root 4.

A shroud 1 is integrally provided at a top of the airfoil 2 and has the same composition as the airfoil 2. The shroud 1 can be formed integrally with the airfoil 2 by plastic working. Alternatively, it can be formed using a different material and integrally combined to the airfoil 2 by riveting a tenon.

The shroud 1 has such a structure that the adjacent shrouds 1 are tied in contact with each other while generating contact pressure between the adjacent shrouds 1. The contact stress can be generated between the adjacent shrouds 1 by making an insert angle of the adjacent shrouds 1 in contact with each other different from the insert angle $\alpha$ of the blade root 4.

Assuming that an angle formed between a plane perpendicular to the axis of the blade root 4 and a plane parallel to contact portions of the hooks formed in the blade root 4 and the blade groove 5 (i.e., a hook bearing surface) is $\theta$ as viewed in the axial direction of the turbine rotor, a shortening of the fatigue life can be reduced in this embodiment by setting the insert angle $\alpha$ of the blade root 4 and the angle $\theta$ of the hook bearing surface to satisfy the following formulas 1, 2 and 3:

$$500 \geq \alpha \times \theta \geq 0 \tag{1}$$

$$90 > \theta \geq 0 \tag{2}$$

$$90 > \alpha > 0 \tag{3}$$

Figure 2:
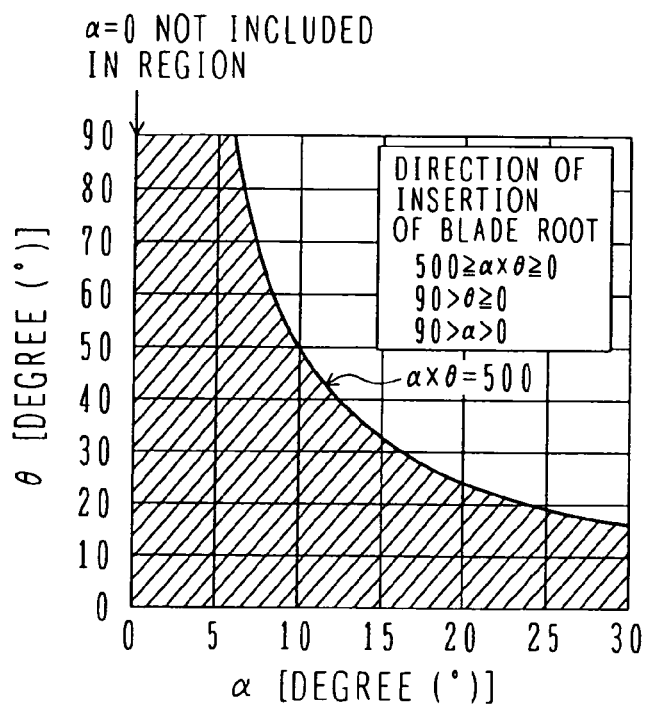
FIG. 2 is a graph showing the relationship between a blade root insert angle α and an angle θ of a hook bearing surface in the present invention.

FIG. 2 is a graph showing the relationship between the blade root insert angle $\alpha$ and the angle $\theta$ of the hook bearing surface. As shown in FIG. 2, the region specified by the formulas 1, 2 and 3 is a hatched region.

In this embodiment, the angle $\theta$ of the hook bearing surface is required to have a value of smaller than 90°. For the turbine blade applied to high and intermediate pressure steam turbines, however, the angle $\theta$ is preferably not larger than 60°. By so setting the angle $\theta$, a risk of slipping-off of the blade can be suppressed even when the hooks of the blade root 4 and the blade groove 5 cause creep deformations in operation for a long time and the gap between the serrations is enlarged.

For the turbine blade applied to a low pressure steam turbines, the angle $\theta$ of the hook bearing surface is preferably not larger than 65°. By so setting the angle $\theta$, a risk of slipping-off of the blade can be suppressed even when the hooks of the blade root 4 and the blade groove 5 cause erosions in operation for a long time and the gap between the serrations is enlarged.

In this embodiment, the steam turbine blade may have any of the free standing blade structure in which adjacent blades are tied with each other, the grouped blade structure in which a plurality of blades are tied with each other, and the integral cover structure in which all blades are tied with each other. Among them, the grouped blade structure or the integral cover structure is preferable for the purpose of suppressing a reduction of the turbine performance caused by steam leak at the blade top and reducing the blade stress induced by vibration.

The steam turbine blade of this embodiment can be applied to any of a system including high, intermediate and low pressure steam turbines, a system including a high/intermediate integral pressure steam turbine and a low pressure steam turbine, and a high/low integral pressure steam turbine. In particular, applications to the high and intermediate pressure steam turbines and the high/low integral pressure steam turbine are preferable.

Thus, according to this embodiment, the steam turbine blades can be attached in a larger number. Also, by setting the products of values of the insert angle $\alpha$ of the blade root 4 and the angle $\theta$ of the hook bearing surface to be not larger than 500, the steam turbine blade is obtained in which the peak stresses generated in the blade root 4 and the blade groove 5 can be reduced to a practically allowable level. As a result, it is possible to suppress a shortening of the fatigue life of the blade root 4 and the blade groove 5, and to improve reliability of the turbine blade and the turbine rotor 3 which are important components in design of the steam turbine.

Further, according to this embodiment, when the blade has the blade root of the axially-inserted fir tree type and the blade root is inserted in the direction forming the predetermined angle α larger than 0° relative to the axial direction of the turbine rotor, the steam turbine blade and the steam turbine using the blades are obtained which can suppress the peak stresses generated at the bottoms of notches formed in the blade root and the blade groove, and which can also suppress fretting fatigue from being induced by contact between peak stress generating areas and areas opposed to the peak stress generating areas at the bottoms of notches formed in the blade root and the blade groove.

Second Embodiment

This second embodiment differs from the first embodiment in that a lower limit value for the range of the angle θ of the hook bearing surface is set to 39°, and the insert angle α of the blade root 4 and the angle θ of the hook bearing surface are satisfied by the following formulas 4, 5 and 6. The structure of the steam turbine blade in this second embodiment is the same as that in the first embodiment.

$$500 \geq \alpha \times \theta \geq 0 \quad (4)$$

$$90 > \theta \geq 39 \quad (5)$$

$$90 > \alpha > 0 \quad (6)$$

Figure 3:
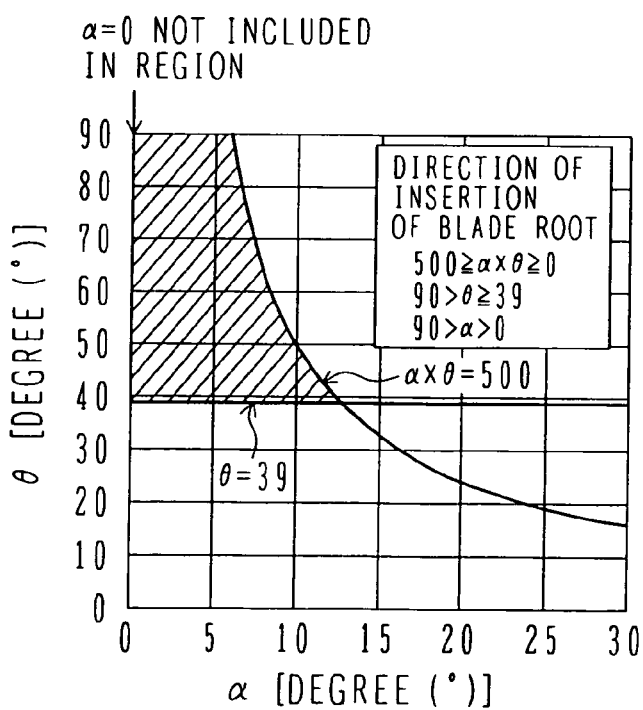
FIG. 3 is a graph showing the relationship between the blade root insert angle α and the angle θ of the hook bearing surface in the present invention.
Figure 4:
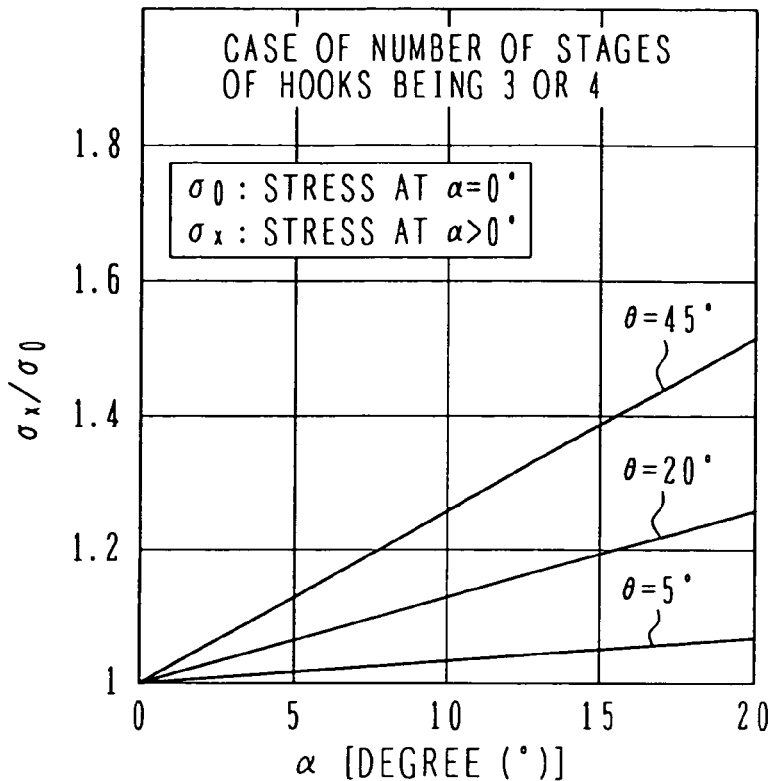
FIG. 4 is a graph showing the relationship among an increase rate (σx/σ0) of peak stress, the angle θ of the hook bearing surface, and the blade root insert angle α when α is larger than 0°.
Figure 5:
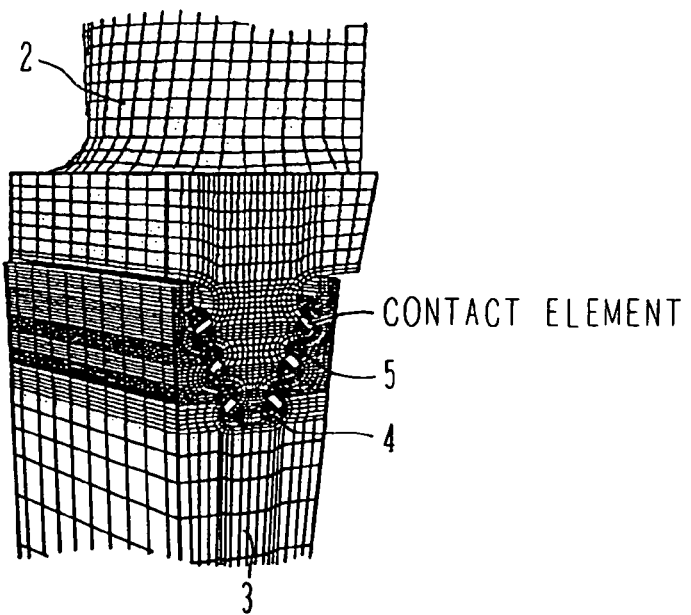
FIG. 5 shows an analytical model used in a three-dimensional finite element analysis regarding the present invention.
Figure 6A:
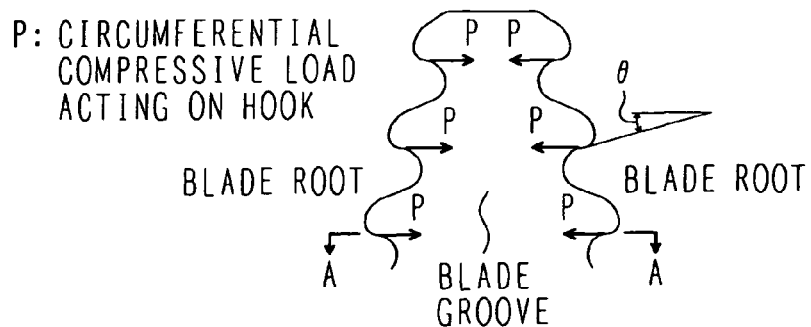
FIGS. 6A-6C are illustrations for explaining a mechanism that the peak stress is increased when α is larger than 0°.
Figure 6B:
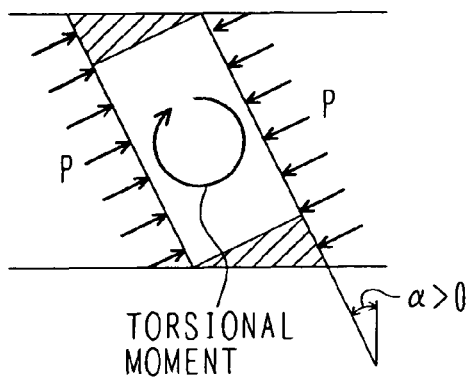
Figure 6C:
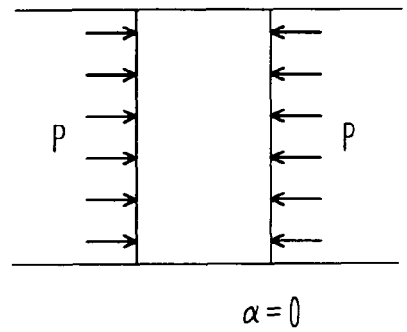
Figure 7:
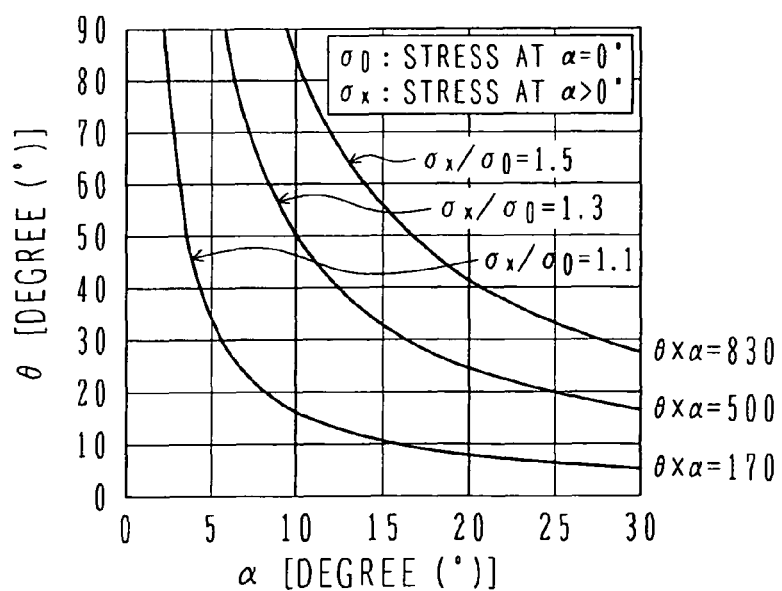
FIG. 7 is a graph showing the relationship between α and θ when (σx/σ0) is 1.1, 1.3 and 1.5, these ratios being found extracted on the results of FIG. 4.
Figure 8:
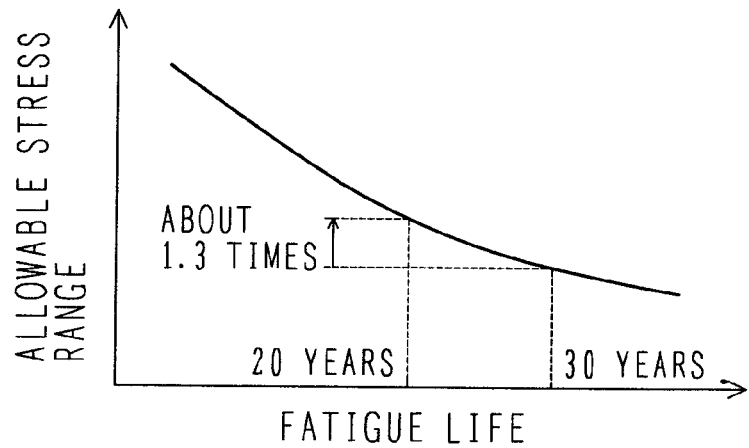
FIG. 8 is a graph showing a characteristic curve of an allowable stress range versus fatigue life which was obtained from fatigue tests of turbine blade materials.
Figure 9:
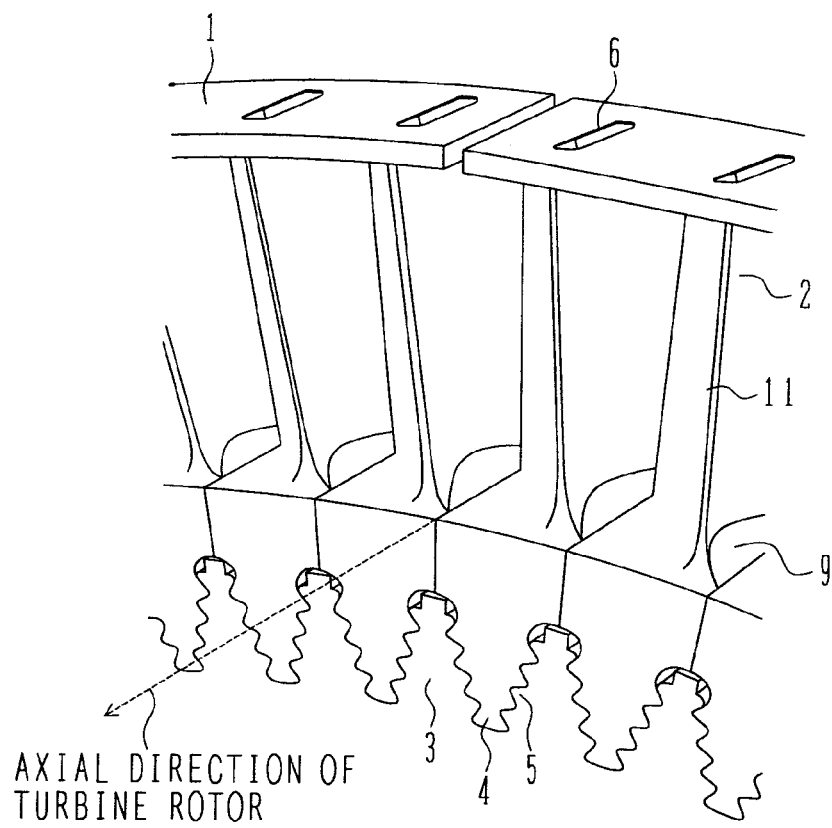
FIG. 9 is an oblique perspective view of a known steam turbine blade.
Figure 10:
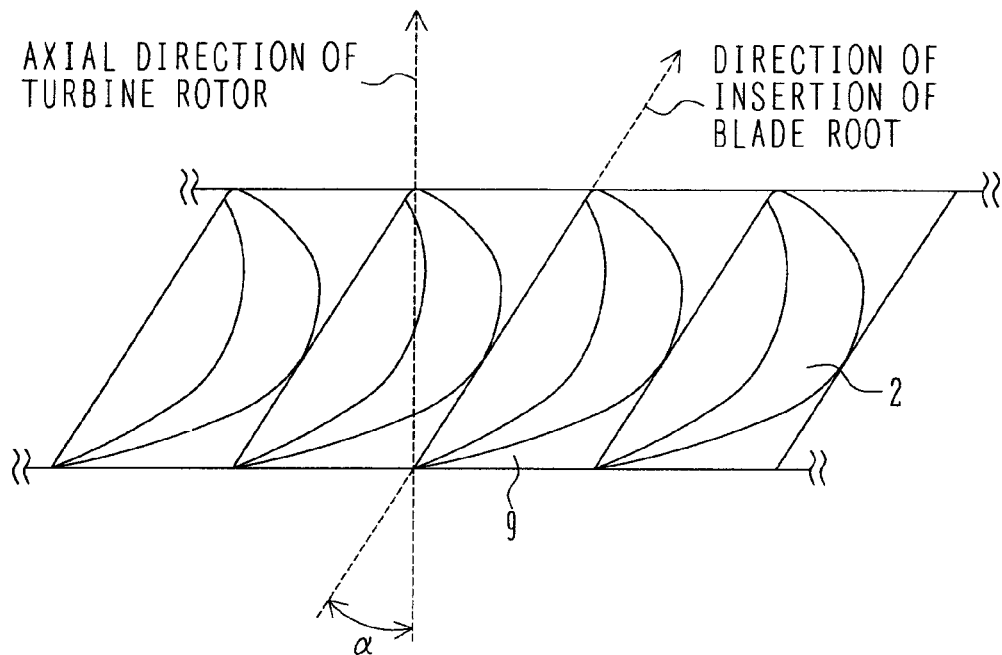
FIG. 10 is a plan view of the structure of a known steam turbine blade as viewed from the outer peripheral side in the radial direction of a turbine rotor.
Figure 11:
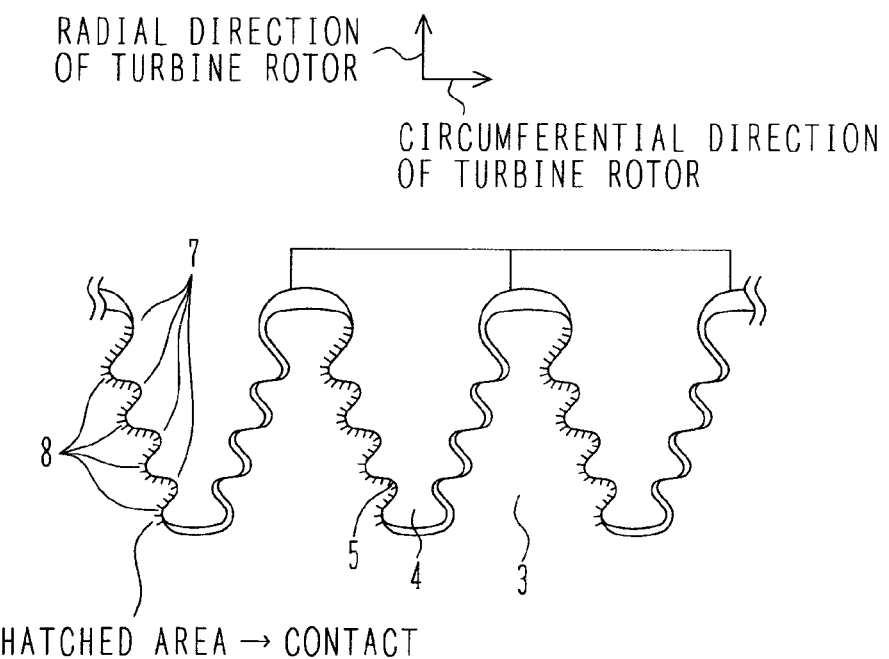
FIG. 11 is a cross-sectional view, as viewed in the axial direction of the turbine rotor, showing a state of the known steam turbine blade where a blade root and a blade groove contact with each other at the bottoms of their notches between peak stress generating areas and areas opposed to the peak stress generating areas.

FIG. 3 is a graph showing the relationship between the blade root insert angle α and the angle θ of the hook bearing surface. As shown in FIG. 3, the region specified by the formulas 4, 5 and 6 is a hatched region.

In this embodiment, by setting the angle θ of the hook bearing surface to be not smaller than 39°, even when any magnitude of centrifugal force acts on the turbine blade, the bearing surfaces of the hooks formed in the blade root 4 and the blade groove 5 cause relative slide between them such that the turbine blade slides in the radial direction of the turbine rotor 3, thereby suppressing fretting fatigue that is otherwise induced upon the blade root 4 and the blade groove 5 contacting with each other at the bottoms of their notches between the peak stress generating areas and the areas opposed to the peak stress generating areas.

Thus, as with the first embodiment, this second embodiment can be applied to any type of steam turbine and enables the steam turbine blades to be attached in a larger number. Also, the peak stresses generated in the blade root 4 and the blade groove 5 can be reduced to a practically allowable level. Further, the steam turbine blade is obtained which can suppress fretting fatigue from being induced by contact between the peak stress generating areas and the areas opposed to the peak stress generating areas at the bottoms of the notches formed in the blade root 4 and the blade groove 5.

Moreover, according to the steam turbine blade of this embodiment, since a shortening of the fatigue life of the blade root 4 and the blade groove 5 can be suppressed, it is possible to improve reliability of the turbine blade and the turbine rotor which are important components in design of the steam turbine.

Third Embodiment

In this embodiment, the range specified for the range of the angle θ of the hook bearing surface in any of the first and second embodiments is applied to only one among the plural stages of hooks 10, which is positioned at the innermost peripheral side in the radial direction of the turbine rotor 3. When the turbine root 4 of the axially-inserted inverted fir tree type is inserted in the direction forming the predetermined angle α relative to the axial direction of the turbine rotor 3, maximum peak stress is generated in many cases at the notch bottom under the hook 10 of the turbine groove 5, which is positioned at the innermost peripheral side in the radial direction of the turbine rotor 3. From such a practical point of view, the range specified for the value of the angle θ of the hook bearing surface is applied in this embodiment to only one among the plural stages of hooks 10, which is positioned at the innermost peripheral side in the radial direction of the turbine rotor 3. Additionally, the structure of the steam turbine blade in this third embodiment is the same as that in the first embodiment, and the hooks 10 are formed in four stages as in the above embodiments.

Thus, as with the first and second embodiments, this third embodiment can be applied to any type of steam turbine and enables the steam turbine blades to be attached in a larger number. Also, the peak stresses generated in the blade root 4 and the blade groove 5 can be reduced to a practically allowable level. Further, the steam turbine blade is obtained which can suppress fretting fatigue from being induced by contact between the peak stress generating areas and the areas opposed to the peak stress generating areas at the bottoms of the notches formed in the blade root 4 and the blade groove 5.

Moreover, according to the steam turbine blade of this embodiment, since a shortening of the fatigue life of the blade root 4 and the blade groove 5 can be suppressed, it is possible to improve reliability of the turbine blade and the turbine rotor 3 which are important components in design of the steam turbine.

What is claimed is:

1. A steam turbine blade comprising:
an airfoil;
a blade root attached to a turbine rotor and having plural stages of hooks in the radial direction of said turbine rotor; and
a platform provided between said airfoil and said blade root,
wherein said blade root is shaped such that said blade root is inserted straight in at a predetermined angle α larger than 0° relative to the axial direction of said turbine rotor,
wherein respective values of said angle α and an angle θ formed by a load bearing surface of each of said hooks, which is positioned at the outer peripheral side in the radial direction of said turbine rotor, relative to a circumferential surface as viewed in the axial direction of said turbine rotor are set to fall within a region specified by the following formulas:

$$500 \geq \alpha \times \theta \geq 0$$

$$90 > \theta \geq 0$$

$$90 > \alpha > 0$$

wherein the turbine blade comprises a shroud at a tip of said blade, wherein said shroud is formed integrally with said airfoil or is integrally combined with said airfoil by a tenon, and wherein the shroud is structured such that adjacent shrouds are tied in contact with each other while contact pressure is generated between the adjacent shrouds by an elastic restoring force caused by a torsional deformation given to the turbine blade.

2. The steam turbine blade according to claim 1, wherein said airfoil has a cross-section, as viewed in the axial direction of said turbine rotor, shaped such that a linear line connecting a leading edge and a trailing edge of said airfoil is inclined relative to the axial direction of said turbine rotor.

3. The steam turbine blade according to claim 1, wherein said angle $\alpha$ is set in the same direction as the inclination of said airfoil and is smaller than 90° relative to the axial direction of the turbine rotor.

4. The steam turbine blade according to claim 1, wherein said blade root has an inverted fir tree shape projecting from the platform side.

5. The steam turbine blade according to claim 1, wherein said platform is shaped such that said platform is inserted at said angle $\alpha$.

6. A steam turbine blade comprising:

an airfoil;

a blade root attached to a turbine rotor and having plural stages of hooks in the radial direction of said turbine rotor; and a platform provided between said airfoil and said blade root, wherein said blade root is shaped such that said blade root is inserted straight in at a predetermined angle $\alpha$ larger than 0° relative to the axial direction of said turbine rotor, wherein respective values of said angle $\alpha$ and an angle $\theta$ formed by a load bearing surface of each of said hooks, which is positioned at the outer peripheral side in the radial direction of said turbine rotor, relative to a circumferential surface as viewed in the axial direction of said turbine rotor are set to fall within a region specified by the following formula:

$500 \geq \alpha \times \theta \geq 0$ $90 > \theta \geq 0$ $90 > \alpha > 0$ wherein the turbine blade comprises a shroud at a tip of said blade, wherein said shroud is formed integrally with said airfoil or is integrally combined with said airfoil by a tenon, and wherein the shroud is structured such that adjacent shrouds are tied in contact with each other while contact pressure is generated between the adjacent shrouds by an elastic restoring force caused by a torsional deformation given to the turbine blade.

7. The steam turbine blade according to claim 6, wherein said angle $\theta$ is applied to only a serration of said hooks which is positioned at the innermost peripheral side in the radial direction of said turbine rotor.

8. The steam turbine blade according to claim 6, wherein said hooks are formed in three or four stages.

9. A steam turbine rotor comprising:

a shaft; and a wheel joined to said shaft, said wheel including plural stages of slotted discs having slots into which steam turbine blades are attached, wherein each slot of said slotted disc is shaped in complementary relation to a shape of a blade root of said steam turbine blade, thus allowing said blade root to be inserted straight in said disc slot at a predetermined angle $\alpha$ larger than 0° relative to the axial direction of said turbine rotor, said blade root having plural stages of hooks in the radial direction of said turbine rotor, wherein respective values of said angle $\alpha$ and an angle $\theta$ formed by a load bearing surface of each of said hooks, which is positioned at the outer peripheral side in the radial direction of said turbine rotor, relative to a circumferential surface as viewed in the axial direction of said turbine rotor are set to fall within a region specified by the following formulas:

$500 \geq \alpha \times \theta > 0$ $90 > \theta \geq 39$ $90 > \alpha > 0$ wherein the turbine blade comprises a shroud at a tip of said blade, wherein said shroud is formed integrally with said airfoil or is integrally combined with said airfoil by a tenon, and wherein the shroud is structured such that adjacent shrouds are tied in contact with each other while contact pressure is generated between the adjacent shrouds by an elastic restoring force caused by a torsional deformation given to the turbine blade.

10. The steam turbine rotor according to claim 9, wherein said blade-root attached disc slot has plural stages of hooks.

11. The steam turbine rotor according to claim 9, wherein said blade-root attached disc slot has a fir tree shape.

12. A steam turbine comprising:

a steam turbine rotor having plural stages of slotted discs provided on a wheel joined to a rotor shaft; and plural stages of steam turbine blades attached to slots of said slotted discs;

each turbine blade in at least one of said plural stages comprising:

an airfoil;

a blade root attached to a turbine rotor and having plural stages of hooks in the radial direction of said turbine rotor; and a platform provided between said airfoil and said blade root, wherein said blade root is shaped such that said blade root is inserted straight in at a predetermined angle $\alpha$ larger than 0° relative to the axial direction of said turbine rotor, wherein the turbine blade comprises a shroud at a tip of said blade, wherein said shroud is formed integrally with said airfoil or is integrally combined with said airfoil by a tenon, and wherein the shroud is structured such that adjacent shrouds are tied in contact with each other while contact pressure is generated between the adjacent shrouds by an elastic restoring force caused by a torsional deformation given to the turbine blade, wherein said steam turbine rotor is the steam turbine rotor according to claim 9.

13. The steam turbine according to claim 12, wherein said steam turbine blade is provided in all the stages of steam turbine rotors.

14. A steam turbine power plant equipped with any of a system including a high pressure steam turbine, an intermediate pressure steam turbine and a low pressure steam turbine, a system including a high/intermediate integral pressure steam turbine and a low pressure steam turbine, and a high/low integral pressure steam turbine, at least one of said high pressure steam turbine, said intermediate pressure steam turbine, said high/intermediate integral pressure steam turbine, said low pressure steam turbine, and said high/low integral pressure steam turbine being constituted by the steam turbine according to claim 12.

* * * * *